United States Patent [19]

Siddall

[11] 4,392,509

[45] Jul. 12, 1983

[54] FURNACE VALVE

[75] Inventor: Michael Siddall, Pooraka, Australia

[73] Assignee: Sidchrome (S.E. Asia) Limited, Hong Kong

[21] Appl. No.: 151,473

[22] Filed: May 19, 1980

[30] Foreign Application Priority Data

May 23, 1979 [AU] Australia .............................. PD8920

[51] Int. Cl.³ ............................................. F16K 49/00
[52] U.S. Cl. .................................. 137/340; 137/375; 251/147; 251/300
[58] Field of Search ............... 137/340, 375; 251/299, 251/300, 301, 147

[56] References Cited

U.S. PATENT DOCUMENTS

| 310,107 | 12/1884 | Wilson | 251/300 |
|---|---|---|---|
| 593,476 | 11/1897 | Kennedy | 137/340 |
| 775,654 | 11/1904 | Higgins | 13/32 |
| 2,029,864 | 2/1936 | Elgaard | 137/340 |
| 2,360,389 | 10/1944 | Bergman | 251/301 |
| 2,467,945 | 4/1949 | Pottmeyer | 251/301 |
| 3,047,006 | 7/1962 | Transeau | 251/301 |
| 3,448,761 | 6/1969 | Feinman | 137/375 |
| 3,770,005 | 11/1973 | Brandenburg | 137/340 |
| 3,837,356 | 9/1974 | Selep et al. | 137/375 |
| 3,964,507 | 6/1976 | Jandrasi et al. | 137/375 |
| 4,121,611 | 10/1978 | Bayerl | 137/340 |
| 4,275,763 | 6/1981 | Fahrig | 137/375 |

FOREIGN PATENT DOCUMENTS 955509  4/1964  United Kingdom ............... 137/375

Primary Examiner—A. Michael Chambers
Attorney, Agent, or Firm—Jay L. Chaskin

[57] ABSTRACT

A furnace valve suitable for use in an electric furnace in the manufacture of mineral fibre comprising a water cooled sleeve provided with a carbonaceous member which is formed with a flow passage extending therethrough and a shutter plate movable across the face of the carbonaceous member to control the effective discharge area of the flow passage.

8 Claims, 6 Drawing Figures

FURNACE VALVE

This invention relates to a valve which is useful in a high temperature furnace, for example, a furnace which is used for the melting of slag or other fusible oxide compounds of metals/non-metals (for example, glass).

BACKGROUND OF THE INVENTION

Slag which is used in the manufacture of mineral fibre for insulating purposes may contain a number of mineral substances, and the main constituents are usually in the following descending order of concentration, namely, calcium oxide, silicon dioxide, aluminium oxide, magnesium oxide, and iron oxide. For satisfactory melting of this slag it is necessary to run the furnace of temperatures which may reach as high as 1,600° C., and considerable difficulty is encountered in the discharging of such a high temperature melt.

If the melt within the furnace adjacent a discharge opening is allowed to cool it will at least partly solidify and the solidified slag needs to be broken before the melt will again flow outwardly through the opening. This is very inconvenient, and in some instances can be dangerous. This is one of the main reasons why the furnaces which are used for the melting of slag are usually combustion furnaces, containing slag and coke, and being surrounded by a water jacket. Air is introduced through tuyeres in or surrounding the lower wall of the furnace, and as the coke in the furnace burns, the high temperature melts the slag which trickles down through the coke and runs out as a continuous hot stream from an opening in or near the base of the furnace. However, the nature of the furnace is such that the flow rate is widely variable, dependant upon the conditions of combustion, and if the discharging slag is run onto a spinning disc for example for the manufacture of fibrous material for insulation purposes, a wide variation of quality results.

In the alternative, if an electric furnace is used, there are a number of advantages including reduction of pollution and a much cleaner operation. However, an electric furnace, if used for continuous production, will contain a body of molten slag in the base of the furnace, and it is desirable that the flow rate of discharge of the melt should be carefully regulated without the slag chilling to such a degree that it partly solidifies.

In the U.S. Pat. Nos. 2,790,019 (STALEGO), 686,836 (RUTHENBURG) and 1,202,837 (HECHENBLEIKNER) there are disclosed various water cooled jackets for the discharge openings of furnaces, and STALEGO also discloses the use of a graphite block over which the melt of an electric furnace can discharge in an overflow manner. The STALEGO furnace is useful for batch production, but quite unsuited for continuous production of a melt such as is required for the production of mineral fibre.

As far as is known, prior art does not include any furnace valve which is suitable for controlling a flow rate of fused slag (or other oxide compounds of metals/non-metals), being discharged from the body of melt contained in an electric furnace, yet accurate control of flow rate is of importance in the maintaining of constant quality of product.

The main object of this invention is to provide a furnace valve which is useable to accurately control such flow rate under continuous production conditions.

BRIEF SUMMARY OF THE INVENTION

Briefly, in this invention, a furnace valve comprises a water cooled sleeve which carries a carbonaceous member which itself has a flow passage extending therethrough, and a shutter plate is movable across the face of the carbonaceous member to control the effective discharge area of the flow passage.

The carbonaceous member is, of course, subject to severe abrasion by the melt, but can be easily and inexpensively replaced. The water cooled sleeve is likely to be long-lasting because its low temperature will resist oxidising, and also because it will chill some of the melt which will then function to protect it. It also chills the carbonaceous member and reduces burning of that member.

Specifically, in this invention a furnace valve comprises a water cooled sleeve having an inner tubular wall and an outer wall, a water cooling space between the inner and outer walls, and conduit connection means forming inlet and outlet ports to said water cooling space, a carbonaceous member carried by the sleeve and having a flow passage extending therethrough, and a shutter, and guide means controlling the shutter for movement across the outer face of said carbonaceous member to control the effective discharge area of said flow passage.

In an embodiment of the invention, the shutter plate is water cooled, and is movable between fully open and fully closed positions. The shutter plate can be pivoted, and the pivotal movement can be effected by application of a force on a control lever extending outwardly from the shutter plate.

BRIEF DESCRIPTION OF THE DRAWINGS

Two embodiments of the invention are described hereunder in some detail with reference to and are illustrated in the accompanying drawings, in which.

Figure 1:
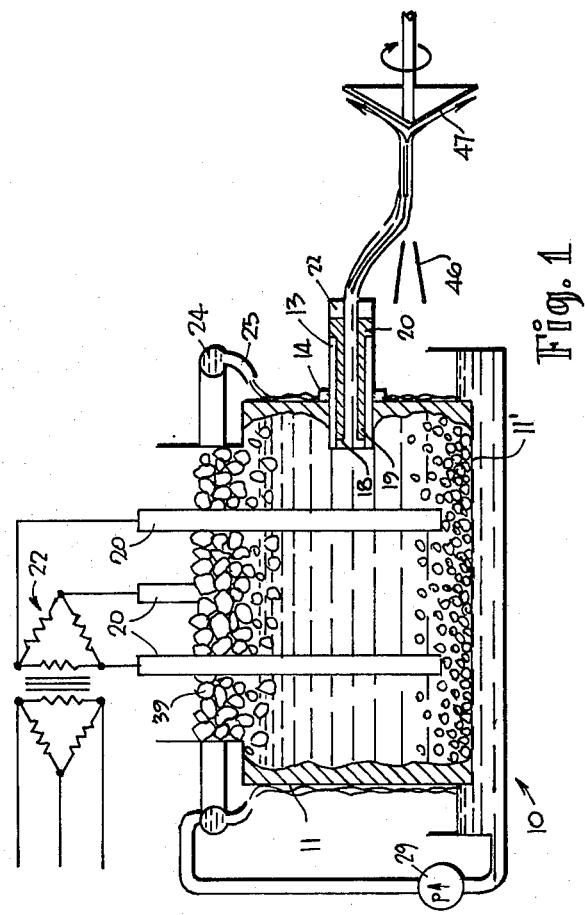
FIG. 1 is a diagrammatic section of a furnace having a valve.
Figure 2:
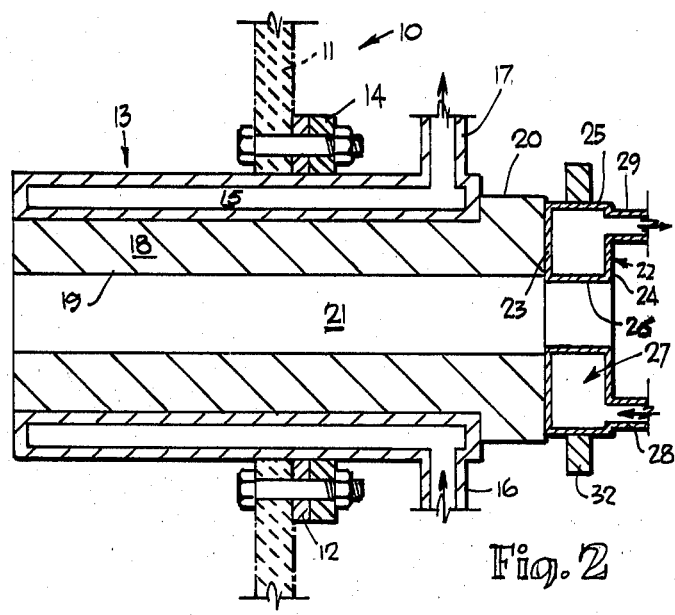
FIG. 2 is an elevational section of the valve.
Figure 3:
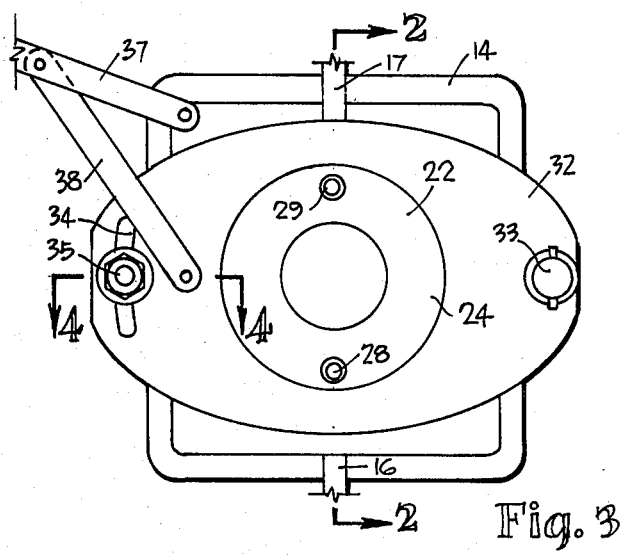
FIG. 3 is a front elevation of the valve, and identifies by line 2—2 the section illustrated in FIG. 2.
Figure 4:
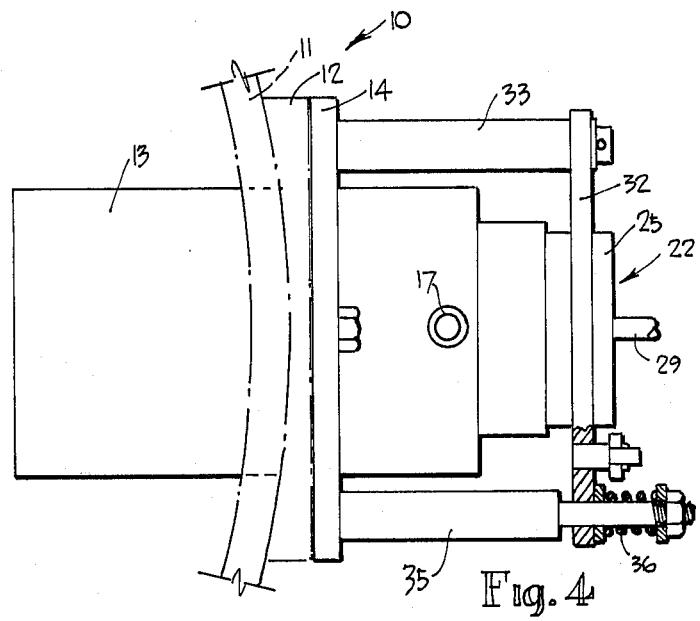
FIG. 4 is a plan view of FIG. 3, partly sectional as shown by lines 4—4 on FIG. 3.

In the first embodiment of FIGS. 1, 2, 3 and 4, an electric furnace 10 is provided with a base or floor 11' of refractory material and a mild steel side wall 11, and between the upper and lower edges of the mild steel side wall is an opening surrounded by a flange reinforcement 12.

There is provided a water cooled sleeve 13, in this embodiment formed from stainless steel (which is found to be more effective than many other materials in resisting the extremely high temperatures within the furnace), the stainless steel sleeve 13 having a surrounding flange 14 which is bolted to the flange reinforcement 12 surrounding the opening in the mild steel wall 11 of the furnace 10. The sleeve 13 has an inner wall and an outer wall forming therebetween a water cooling space 15, having as its inlet and outlet ports the inlet conduit connection tube 16 and the outlet conduit connection tube 17. The sleeve 13 is provided with a carbon member 18 which is a liner, having a stem portion 19 extending into the sleeve 13, and an enlarged head 20 abutting the outer surface of the sleeve 13. The carbon member 18 has a flow passage 21 extending through it.

A shutter 22 is circular in elevation, having an inner plate 23, an outer plate 24, a peripheral tube 25 and an inner tube 26 forming a flow passage, all defining a water cooling space 27, and the inlet and outlet ports are formed by the inlet and outlet conduit connection tubes 28 and 29. The shutter 22 also embodies a shutter mounting plate 32, the shutter mounting plate 32 being an elongate plate having a central aperture of the same or slightly larger diameter than the peripheral tube 25 and being welded to it, the shutter mounting plate being pivoted at one of its ends to the flange 14 of the stainless steel sleeve, by means of a pivot pin 33, and the other end of the shutter mounting plate 32 has a curved slot 34 therein which passes over a guide pin 35, the second pin 35 being surrounded by a spring 36 which applies an almost constant pressure to the shutter mounting plate 32 to hold the shutter inner plate 23 in face to face contact with the outer surface of the carbon sleeve head 20. The shutter mounting plate 32 is coupled to a control lever 37 by a short link 38, and actuating the control lever 37 moves the shutter 22 about its pivot pin 33 between an open and closed position to control the effective discharge opening of the flow passage of the carbon member 18.

By utilising a carbon sleeve, the danger of the melt being chilled as it passes from within the furnace is greatly reduced, and by utilising the shutter, compensation can be made for variation of head height or other pressures which tend to cause the rate of outflow of the melt from within the electric furnace to vary.

Figure 5:
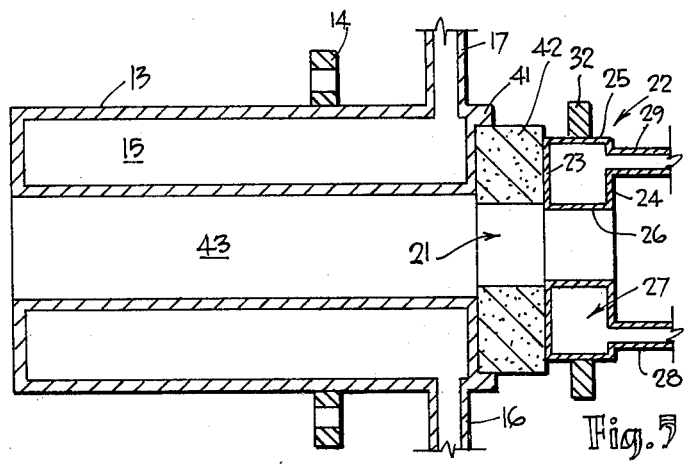
FIG. 5 is a sectional view similar to FIG. 2, but showing an alternative embodiment wherein the carbonaceous member is an annular disc of carbon.

The second embodiment of FIG. 5 is somewhat similar to the first embodiment. Once again use is made of a water cooled sleeve 13, but the water cooled sleeve at its outer end is provided with a rim 41, and the rim is contiguous with the outer peripheral surface of an annular carbon discharge ring 42, which is washer-like in shape, and which abuts the end of the sleeve. The inner wall of the water cooled sleeve has extending through it a central flow passage 43 for flow therethrough of molten slag, and this aligns with the central flow passage 21 through the carbon washer.

The carbon washer is engaged by inner wall 23 of a shutter 22 as in the first embodiment.

Figure 6:
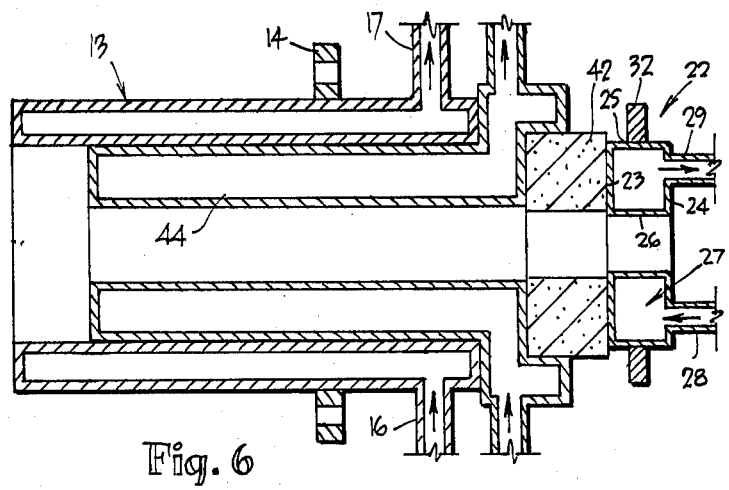
FIG. 6 is a sectional view similar to FIG. 5 showing yet another alternative embodiment.

In the embodiment of FIG. 6, use is made of water-cooled outer and inner stainless steel sleeves 13, 44, with an annular carbon ring 42 seated in an annular recess formed at the end of the sleeve 44. In all embodiments, the slag where it leaves the furnace, passes through an aperture in carbon and although the carbon deteriorates rapidly, its deterioration is reduced by mounting in a water cool sleeve, and in any case, the replacement cost is relatively small, and the danger of solidification or partial solidification in the carbon is much reduced.

Carbon can be replaced by graphite or other suitable carbonaceous material capable of withstanding the heat and abrasion of molten slag without excessive deterioration.

Although not shown in the drawings, the furnace is provided in its side wall with a second discharge sleeve which lies approximately in the plane of the base 11' and constitutes a top hole for molten iron for example, which having collected in the hearth of the furnace, is required to be continuously or periodically tapped.

The invention, although simple overcomes one of the main difficulties encountered with the use of electric furnaces, and provides very effective means for flow rate control.

Various modifications in structure and/or function may be made to the disclosed embodiments by one skilled in the art without departing from the scope of the invention as determined by the claims.

I claim:

1. A valve for controlling the rate of discharge of a melt from a furnace, comprising:

a water cooled sleeve having an inner tubular wall and an outer wall, a water cooling space between the inner and outer walls, and conduit connection means forming inlet and outlet ports to said water cooling space, a carbon member carried by the sleeve and having a flow passage extending therethrough, said carbon member being a liner having a stem portion which is contained within the sleeve and an enlarged head which abuts the outer end of the sleeve and forms substantially the terminal end of the flow passage, and a shutter, and guide means controlling the shutter for movement across the outer face of said enlarged head to control the effective discharge area of said flow passage.

2. A valve for controlling the rate of discharge of a melt from a furnace, comprising:

a water cooled sleeve having an inner tubular wall and an outer wall, a water cooling space between the inner and outer walls, and conduit connection means forming inlet and outlet ports to the water cooling space;

a carbonaceous member carried by the sleeve and having a flow passage extending therethrough, said carbonaceous member being a liner having a stem portion which is contained within the sleeve and an enlarged head which abuts the outer end of the sleeve; and a pivot pin secured with respect to said water cooled sleeve, a shutter pivotally mounted at one of its ends on said pivot pin, walls defining a slot in the other end of said shutter, a guide pin also secured with respect to said sleeve and extending through said slot, and spring means on said guide pin applying pressure to said shutter restraining movement of said shutter and urging said shutter into contact with the outer face of said enlarged head.

3. A valve for controlling the rate of discharge of a melt from a furnace, comprising:

a water cooled sleeve having an inner tubular wall and an outer wall, a water cooling space between the inner and outer walls, and conduit connection means forming inlet and outlet ports to said water cooling space;

a carbonaceous member carried by the sleeve and having a flow passage extending therethrough, said carbonaceous member being a liner having a stem portion which is contained within the sleeve and an enlarged head which abuts the other end of the sleeve;

an outstanding mounting flange intermediate the ends of the water cooled sleeve and having securing means for securing the sleeve to a furnace wall, a pivot pin and a guide pin both extending from said flange; and a shutter comprising inner and outer plates joined together by inner and outer tubes thereby defining between them a shutter water cooling space, shutter conduit connection means forming inlet and outlet ports to said shutter mounting plate pivotally engaging said pivot pin at one of its ends and having walls at the other end defining a slot, said guide pin extending through said slot and limiting pivotal movement of the shutter, and a lever arm coupled to the shutter for controlling said pivotal movement.

4. A valve according to claims 2 or 3 wherein the material of the carbonaceous member is carbon.

5. A valve according to claims 1 or 2 wherein the shutter has walls defining a shutter water cooling space, and shutter conduit connection means form inlet and outlet ports to said shutter water cooling space.

6. A valve according to claims 1 or 2 wherein said water-cooled sleeve has an outstanding mounting flange intermediate its ends, and having securing means for securing the sleeve to a furnace wall.

7. A valve according to claims 1 or 2 or 3 wherein the furnace is an electric furnace.

8. A valve according to anyone of claims 1 or 2 or 3 wherein the shutter movement is substantially in the plane of the outer face of the enlarged head.

* * * * *